Feb. 27, 1962      J. O. THORSHEIM      3,022,987
CONTROL APPARATUS
Filed March 23, 1959
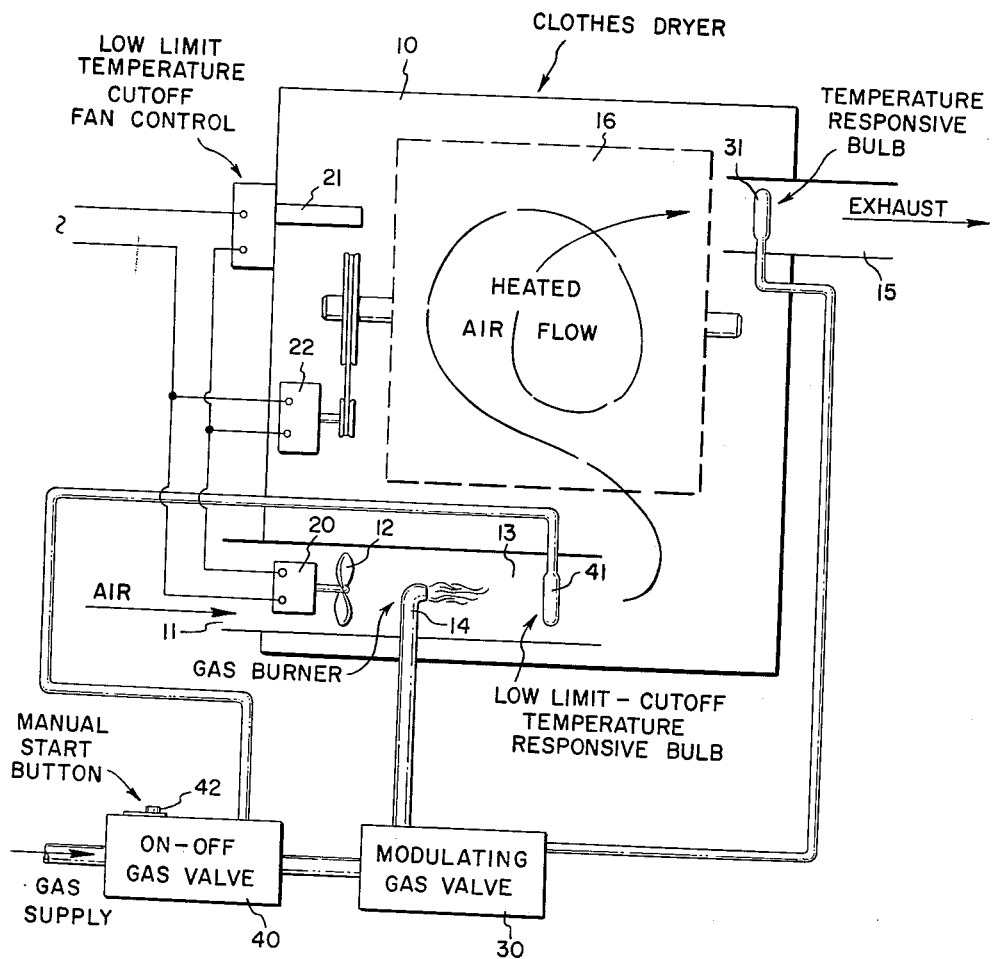
INVENTOR.
JOSEPH O. THORSHEIM
BY *Clyde C. Blinn*
ATTORNEY

3,022,987
CONTROL APPARATUS
Joseph O. Thorsheim, Minneapolis, Minn., assignor to Minneapolis-Honeywell Regulator Company, Minneapolis, Minn., a corporation of Delaware
Filed Mar. 23, 1959, Ser. No. 801,298
5 Claims. (Cl. 263—10)

The present invention is concerned with an improved control system which is particularly adapted for use with drying apparatus. The system modulates the heat supply to the drying apparatus as a function of the exhaust air temperature, and when another parameter or condition reaches a predetermined level indicative of a low heat output of the heat source, the heat supply is shut off.

Numerous types of control systems for drying apparatus and domestic clothes dryers are presently available; however, a need for a simple and yet reliable manner of controlling the heat supply to a dryer still exists. A great many of the domestic clothes dryers presently on the market use timing apparatus to control the length of the drying operation. Such control systems require that the operator become familiar with the operation; so that, the correct amount of time is selected for a predetermined type of load or wet clothes which are placed in the dryer. Many attempts have been made to use relative humidity responsive devices to control the length of the drying cycle. The environmental conditions of such a relative humidity responsive devices pose many problems which heretofore have not been altogether solved.

The present invention is concerned with a simple and yet reliable manner of controlling the operation of a source of heat to a dryer. The heat supply is varied or modulated depending upon the exhaust air temperature. As the moisture is removed from the clothes in the dryer and the amount of latent heating required decreases, the sensible heating increases the exhaust air temperature and the heat supply must be reduced. Upon the reduction of the heat supply various conditions and parameters affecting the operation of the dryer change. When one of these parameters such as inlet heated air temperature reaches some predetermined low value the drying has been accomplished and the heat supply can be terminated.

An object of the present invention is to provide an improved dryer control system.

Another object of the present invention is to provide a dryer control system for varying the heat supply to maintain a predetermined exhaust temperature, and as a parameter indicative of the level of the heat supply reaches a predetermined value, the heat supply is terminated.

These and other objects of the present invention will become apparent upon the study of the specification and claims of which a single FIGURE is a schematic representation of the drying apparatus control system.

Referring to the single figure, a drying apparatus or clothes dryer 10 is shown in schematic form. The clothes dryer might be of a conventional type which has a door for inserting a load of wet clothes into a rotating drum or a tumbler 16. The type of drying apparatus is of no particular concern, but for explanation purposes, a conventional clothes dryer has been selected. An air inlet 11 is provided, and air is forced into the dryer chamber by a fan 12. The air passes through a heating chamber 13 to be heated by a conventional gas burner 14. The inlet air is heated, and the heated air and mixed combustion gases pass into the chamber containing the clothes to pick up moisture. The moisture is carried out the exhaust passage 15.

Fan 12 is driven by a motor 20 which might be connected to a conventional source of power through a low limit temperature controller 21. Controller 21 is set to energize the fan motor whenever the temperature in the dryer chamber is slightly above the ambient temperature. A tumbler motor 22 is energized by controller 21. For explanation purposes, the cut-off temperature for controller 21 might be 110° F. Whenever the temperature within the dryer chamber is above 110° the fan is driven to pull in the air through the inlet passage 11. The heat source or flow of gas to burner 14 is controlled by a conventional modulating valve 30. The valve is controlled by a remotely connected temperature responsive bulb 31 which is positioned in the exahust passage 15 to respond to the temperature of the exhaust gases. When bulb 31 is cold, valve 30 is wide open, and as the temperature of bulb 31 increases above some predetermined value such as 140° F., the valve 30 will gradually close down to decrease the flow of gas to burner 14.

The heated air supplied to the drying chamber will be cooled during the beginning of a drying operation since the heat is used for latent heating. The sensible heating of the air is sacrificed for the latent heating, and the moist air exhausting through passage 15 will be relatively cool. As the clothes become dryer and less latent heating is necessary, the heat source is more effective in raising the temperature of the air in the drying chamber; therefore, the exhausting air will begin to increase in temperature. The temperature sensor 31 is effective to gradually reduce the gas flow to burner 14 thereby cutting down the heat source or maintain the temperature of the exhaust gases below the stated 140° level.

As the exhaust air temperature increases, a number of parameters or conditions change, and any one of these parameters or conditions can be indicative of the need for a termination in the drying operation. For example, the mechanical position of an operating stem of the modulating gas valve 30 would indicate the level of the heat source and thus the degree of dryness. As the modulating gas valve decreases the flow of gas to burner 14, the gas pressure would vary proportional to the output of the heat source, and the gas pressure would be indicative of the degree of dryness of the load on the dryer. Of the many parameters and conditions available, the temperature of the air leaving the heating chamber 13 appears to be more adaptable to existing controls. The temperature of the heated air in chamber 13 decreases as the gas flow to burner 14 is decreased. When the burner has modulated down to a predetermined low gas flow as a result of the increase in the exhaust air temperature, the low temperature in chamber 13 is indicative of the degree of dryness of the clothes in the dryer and the heat source is shut off.

Connected upstream valve 30 is a conventional on-off gas valve 40. Valve 40 has a remote temperature responsive bulb 41 connected thereto for turning the valve off when the temperature of the bulb 41 is below a predetermined temperature. Bulb 41 is responsive to the temperature of the air which is delivered to the drum 16. For explanation purposes, valve 40 can be considered to close when the temperature of bulb 41 drops below 240° F. As the gas to burner 14 is decreased depending upon the degree of dryness of the clothes in the dryer 10, the temperature of bulb 41 will decrease to terminate the operation of the heat source by closing valve 40. Valve 40 has a manual start button of a conventional type; so that, at the beginning of the drying operation, button 42 can be depressed to hold the gas valve 40 on until the temperature of bulb 41 and controller 21 is high enough to start the proper operation of the dryer. The manner of starting the dryer operation and controlling fan 12 has been selected for explanation purposes, but as a practical matter, there are many other ways the operation can be initiated.

Operation

At the beginning of the operation of the dryer, a load of damp clothes would be inserted into the chamber of the dryer 10. The manual start button 42 is depressed to turn valve 40 on. Since modulating gas valve 30 is open, gas will flow to burner 14. As soon as bulb 41 reached a temperature of approximately 240°, valve 40 would remain on even though manual button 42 was released. As burner 14 is full on, the manual start button need be depressed a short time before bulb 41 is heated sufficiently to keep valve 40 open. The air in the drying chamber 10 is immediately heated, and controller 21 energizes fan motor 20 and tumbler motor 22.

Even though the full output of the heat source or burner 14 is applied to the drying operation, the exhaust air temperature passing through passage 15 is relatively low. The heat supplied by the heating source is converted to latent heating which is necessary to evaporate the moisture from the clothes. The air exhausting from the dryer is relatively cool and very moist. As the clothes become dry and less of the heat from the heat source is used for latent heating, sensible heating is accomplished to increase the temperature of the air exhausting from the dryer. As bulb 31 increased in temperature to or above the 140° level, the heat source is cut down by decreasing the gas flow to burner 14. Valve 30 can reduce the gas flow when the temperature exceeds 140° depending upon the conventional throttling range of the valve. Even though the heat source is cut down, the temperature of bulb 31 would continue to increase if less latent heating is accomplished and more sensible heating takes place to increase the exhaust air temperature. As the various parameters and conditions, such as the temperature of the air which is delivered to drum 16 upon leaving heating chamber 13 decreases, change as the clothes become dry, the temperature of bulb 41 decreases. When the output of the heat source 14 or the temperature of bulb 41 reaches a predetermined low value such as 240°, the operation of the heat source is terminated by shutting off the gas supply with valve 40. The fan and tumbling action will continue until the temperature in chamber 10 drops to 110° F. The additional action fluffs the clothes and the action is known as the "fluff dry."

With a drying apparatus control system as shown, the length of time for the drying cycle is varied depending upon the amount of moisture in the clothes. When relatively dry clothes are placed in the drying chamber, less latent heating is necessary, and the exhaust temperature as sensed by bulb 31 increases more rapidly to terminate the drying operation in a shorter period. When a relatively large load of moist clothes is placed in the dryer, a greater amount of latent heating is necessary and the heat source operates a longer time to remove the moisture before the exhaust air temperature increased to any degree. The operation of the dryer is more automatic than a dryer using a conventional timer as the length of operation of the dryer is not set by the choice of the operator, but by the time necessary to remove the moisture to bring the state of dryness of the clothes within satisfactory levels. To select different degrees of dryness, the temperature at which valve 40 stops the heat source can be changed; however, for a predetermined cutoff temperature at bulb 41, the clothes would be dried to the same degree regardless of the size of the load or the quantity of moisture initially in the clothes.

While the invention has been described in one particular manner, the applicant desires that the scope of the present invention only be limited by the appended claims in which I claim:

1. In a clothes dryer control system, a dryer chamber, a burner having a heat output for furnishing heated air through an inlet passageway to said chamber, an exhaust duct for exhausting air from said chamber, a gas valve means, means connecting said valve means in a gas supply conduit to control the supply of gas from a source to said burner, a first temperature responsive means, means for mounting said responsive means in said exhaust duct to be responsive to the air temperature of the air exhausting from said dryer chamber, means connecting said temperature responsive means to said gas valve so that said burner heat output is maintained at a level needed to maintain a predetermined exhaust air temperature, second temperature responsive means, means for mounting said second responsive means in said inlet passageway to be responsive to the temperature of the heated air furnished to said chamber, further means for terminating the flow of gas to said burner and means connecting said second temperature responsive means to said further means to terminate the operation of the burner when the temperature of the air furnished to the dryer chamber reaches a selected low value indicating that the clothes are dry.

2. In a clothes dryer control system, a dryer chamber having an air exhaust passage, a heat supply for heating air that is delivered to said chamber, first means for modulating controlling said heat supply to change the temperature of the air delivered to the dryer chamber, temperature responsive means, means for mounting said responsive means in said exhaust passage to be responsive to the temperature of the air leaving said dryer chamber through said exhaust passage, means connecting said temperature responsive means to said first means for maintaining the temperature of air as high as possible without increasing the exhaust air temperature above a predetermined value, second means for stopping the heat supply, second temperature responsive means responsive to the air temperature of the air delivered to said dryer chamber, and means connecting second temperature responsive means to said second means whereby said heat supply is terminated when the temperature of the delivered air temperature decreases to a predetermined value.

3. In a drying control system, a drying chamber, means for supplying heat to heat the inlet air delivered to said chamber, an exhaust passage for said drying chamber for discharging air and moisture removed from the material in said chamber being dried, exhaust air temperature responsive means, means connecting said temperature responsive means to control said means for supplying heat to maintain the exhaust air temperature below a predetermined value, and second means responsive to a condition indicative of the temperature of said heated air supplied to said chamber, further means for shutting off said means for supplying heat, and means connecting said second means to said further means to terminate said heat supply when said condition reaches a value indicative of a predetermined low inlet air temperature.

4. In a drying apparatus, a chamber for holding material which is to be dried, heating means for supplying heat to said chamber to accomplish both sensible and latent heating, said chamber having an exhaust opening for exhausting air from said chamber, first means for varying the heat output of said heating means from a high output to a low output, second means responsive to a condition indicative of the temperature of the air leaving said chamber by said exhaust opening, means connecting said second means to said first means to maintain the exhaust air temperature at a predetermined temperature whereby as the moisture is removed from the material and less latent heat is needed to evaporate moisture in the material and more of said heat output is used for sensible heat, said first means is adapted to reduce the heat output of said heating means, second means for terminating the operation of said heating means, second responsive means responsive to a parameter indicative of a predetermined low level of output of said heating means, and means connecting said second responsive means to said second means to terminate the operation of said heating means when said low level of heat output is reached.

5. In material treating apparatus, a chamber for holding material to be treated, a heat source for supplying heat to said chamber, said chamber having an exhausted passage, means adapted to vary the heat supplied to said chamber by said heat source, first temperature responsive means, means for mounting said responsive means in said exhaust passage to be responsive to the temperature of the gases exhausting from said exhaust passage, means connecting said temperature responsive means to said first means to control the level of heat supplied to said chamber to maintain said exhausting gases at a selected temperature value, second means for terminating the operation of said heat source, third means responsive to said level of said heat supplied to said chamber by said said source, and means connecting said third means to control said second means to determine the termination of the operation of the heat source when said level reaches a predetermined low value.

References Cited in the file of this patent
UNITED STATES PATENTS

| | | |
|---|---|---|
| 2,198,896 | Wetzel | Apr. 30, 1940 |
| 2,398,880 | Broglie | Apr. 23, 1946 |
| 2,767,923 | Matthews | Oct. 23, 1956 |
| 2,807,889 | Dunkelman | Oct. 1, 1957 |

Notice of Adverse Decision in Interference

In Interference No. 93,440 involving Patent No. 3,022,987, J. O. Thorsheim, CONTROL APPARATUS, final judgment adverse to the patentee was rendered Nov. 15, 1965, as to claims 1, 2, 3, 4 and 5.
[*Official Gazette February 15, 1966.*]